Dec. 27, 1966  A. O. SIMKO ETAL  3,294,072
INTERNAL COMBUSTION ENGINE
Filed June 17, 1964  5 Sheets-Sheet 1

AIR MOTION

ALADAR O. SIMKO
LASZLO HIDEG
INVENTORS

BY John R. Faulkner
Robert E. McCollum
ATTORNEYS

Dec. 27, 1966   A. O. SIMKO ETAL   3,294,072
INTERNAL COMBUSTION ENGINE
Filed June 17, 1964   5 Sheets-Sheet 2

LIGHT LOAD

MEDIUM LOAD

ALADAR O. SIMKO
LASZLO HIDEG
INVENTORS

BY *John R. Faulkner*
*Robert E. McCollum*
ATTORNEYS

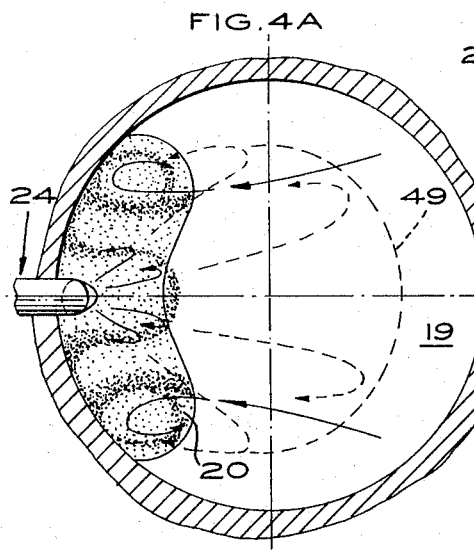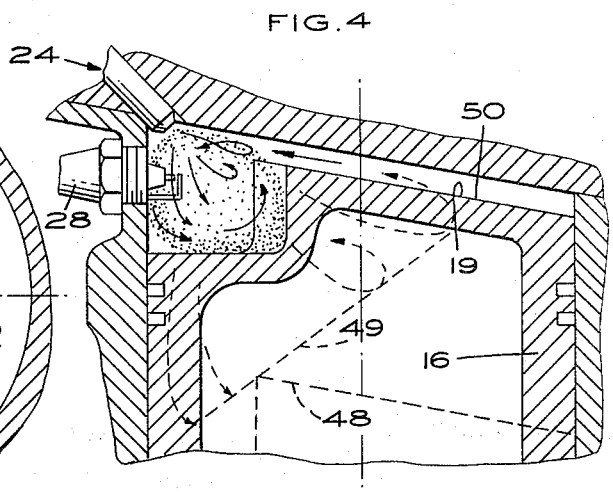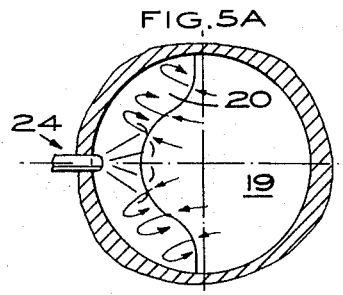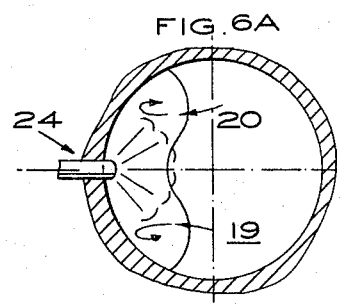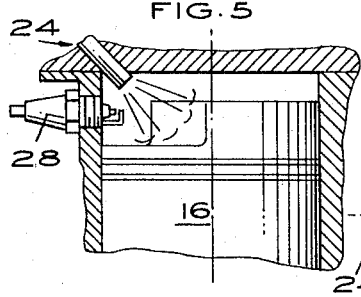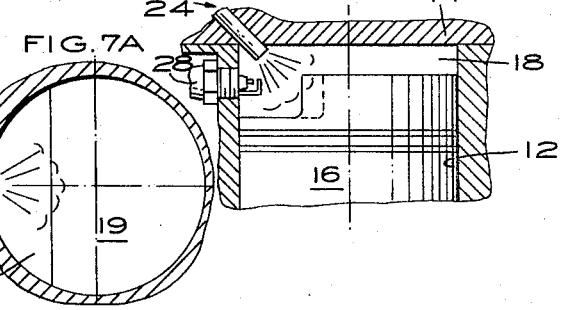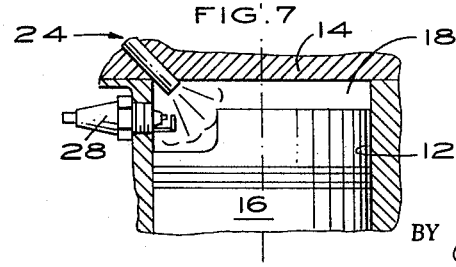

Dec. 27, 1966  A. O. SIMKO ETAL  3,294,072
INTERNAL COMBUSTION ENGINE
Filed June 17, 1964  5 Sheets-Sheet 4
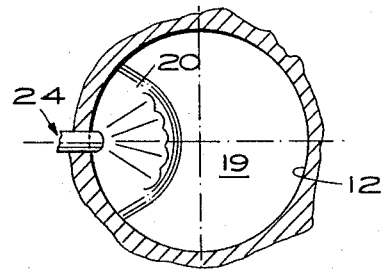
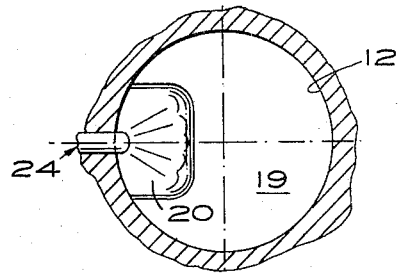
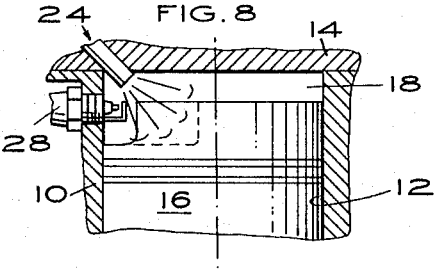
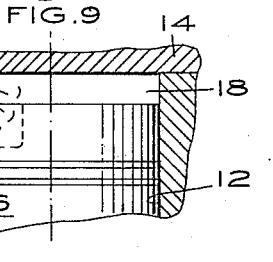
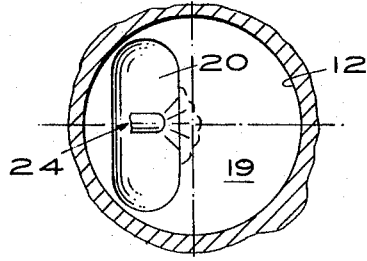
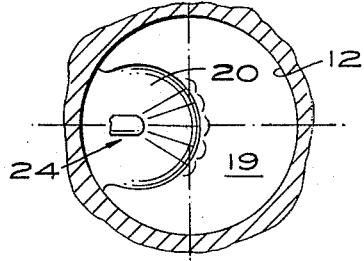
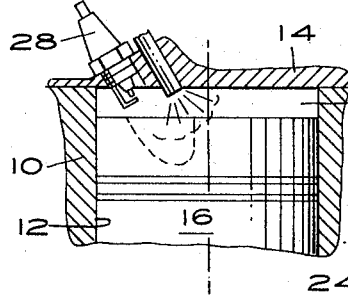
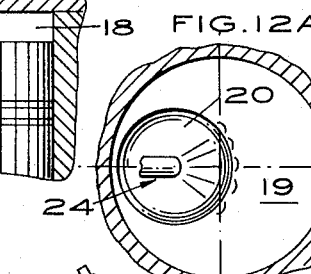
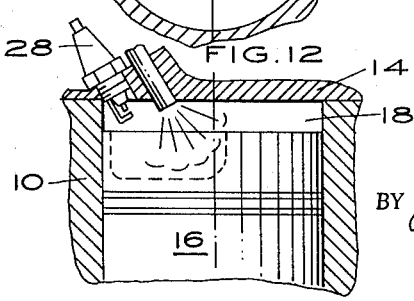
ALADAR O. SIMKO
LASZLO HIDEG
INVENTORS
BY John R. Faulkner
Robert E. McCollum
ATTORNEYS Dec. 27, 1966     A. O. SIMKO ETAL     3,294,072
INTERNAL COMBUSTION ENGINE Filed June 17, 1964     5 Sheets-Sheet 5

ALADAR O. SIMKO
LASZLO HIDEG
      INVENTORS

BY *John R. Faulkner*
    *Robert E. McCollum*
          ATTORNEYS ated Dec. 27, 1966

3,294,072
INTERNAL COMBUSTION ENGINE

Aladar O. Simko, Detroit, and Laszlo Hideg, Dearborn Heights, Mich., assignors to Ford Motor Company, Dearborn, Mich., a corporation of Delaware
Filed June 17, 1964, Ser. No. 375,732
9 Claims. (Cl. 123—32)

This invention relates to an internal combustion engine. More particularly, it relates to one using a squish impregnated stratified charge combustion process.

Conventional internal combustion engines generally are inefficient at part load operation. This is due to a number of reasons. One is that when the fuel-air charge is mixed outside of the combustion chamber, in a carburetor, for example, and ignited by a single spark plug, a charge leaner than 18 or 19 parts air to 1 part fuel generally will not ignite. As a result, the engine is designed with a compromise. That is, the carburetor is usually adjusted so that a stoichiometric or chemically correct mixture, which is approximately a 15 to 1 ratio, generally exists at medium loads, with overrich mixtures at light and full loads. The conventional engine, therefore, does not operate efficiently over the entire load range, and does not have the most favorable fuel economy characteristics.

Attempts have been made in the past to provide an engine utilizing a stratified charge combustion process. This consisted of initiating combustion in a small area of the cylnder where the fuel-air charge was substantially chemically correct, while the remaining portion of the cylinder volume contained essentially pure air or a lean mixture. That is, the cylinder volume was stratified into layers or pie-shaped segments with one or more layers or segments containing a chemically correct fuel-air charge, the remaining containing pure air or a lean mixture. This localized fuel-air charge was ignited as it passed the spark plug, and the ensuing flame spread into all parts of the chamber.

This process generally involved introducing a throttled charge of air into the cylinder volume with an axial swirling motion so that the fuel was carried around the periphery of the cylinder in a somewhat isolated charge until it reached the spark plug, at which point ignition occurred. The squish air movement caused by the ascent of the piston during the compression stroke contributed only turbulence to the mixture to aid in the dispersion and evaporation of the fuel particles.

Prior attempts have also been made to provide unthrottled, direct fuel injected stratified charge engines. However, the fuel injection was generally made in such a way that the swirling motion imparted to the incoming charge of air was the controlling factor due to the location of the injector. As in the throttled air constructions, the squish action merely aided the dispersion of the fuel particles into the air. The combustion chambers were generally symmetrically arranged with respect to the axis of the cylinder bore, and the fuel charge was generally injected in the same direction as the incoming air charge.

Stratified charge engines operating principally on a swirling moton theory are much harder to control due to the fact that it is difficult to obtain an efficient swirl air pattern by control of the shape and motion of the intake valves. The valves generally must be carefully shrouded or masked to impart a particular swirling motion to the incoming air. Since the motion imparted to the air by squish action can be regulated primarily by controlling the shapes of the piston, combustion chamber, and cylinder head, the squish air flow pattern is much easier to control than swirl air. Accordingly, a stratified charge engine operating on a squish impregnated charge combustion process will be more efficient.

The stratified charge combustion process of this invention not only permits operation of an engine with optimum air-fuel mixture ratios that are leaner than normal air throttled engines, but permits unthrottled air operation with direct fuel injection. It improves the shortcomings of prior stratified charge combustion engines by eliminating the necessity of the engine operating with axial swirl and essentially concentric combustion chambers. Also, it eliminates the need for separate swirl type combustion chambers.

The invention relates to a stratified charge combustion engine process and apparatus wherein swirl air motion is substantially negligible, and the main air flow is that provided by the squish action. That is, a small amount of air swirl motion may occur as a result of the induction of the air into the cylinder, but this motion is quickly dissipated, and its effect on the general pattern of motion of air during the compression stage of operation is insignificant. The engine is constructed with a combustion chamber either in the top of the piston or in the cylinder head. It is situated to one side of the center line of the cylinder bore, thus locating the greater portion of the squish area at one side of the cylinder volume.

The increasingly stronger squish action, as the piston approaches top dead center position, promotes flow of all of the air in a direction transverse to the axis of the bore. With negligible air swirl motion, the air flows in streamlines all in the same general direction towards one wall of the bore. Deflecton off this wall, together with the shape of the combustion chamber, induces an air rotation in the localized combustion chamber about a horizontal axis, without extensive mixing. Thus, it creates a tubular-like air-fuel mixture cloud having a chemically correct content in the plane of the spark plug. The fuel injector can be located at a point close to or in a corner between the cylinder wall and head to achieve the greatest penetration of fuel particles into the air in the cylinder volume. Fuel is injected into the squish air in the combustion chamber and cylinder volume against the direction of flow of the squish air streams. The fuel enters at a low particle velocity so that the fuel and opposing air velocities are equalized just prior to the time that the fuel would normally wet the surfaces of the combustion chamber and piston. Discharging the fuel particles against the squish air stream in this manner promotes better fuel evaporation and causes the fuel discharged into the cylinder volume to be carried back into the combustion chamber so that combustion occurs substantially entirely within it.

This construction provides many advantages over prior constructions. First, it permits the load to be controlled primarily by varying the amount of fuel injected, since a full charge of air is drawn into the cylinder on each suction stroke, and the dispersion of the fuel into the air is closely controlled. Therefore, efficient operation occurs regardless of the load. At light loads the amount and length of injection is controlled so that only a relatively small mixture cloud of short radial and narrow circumferential extent will be present in the combustion chamber. At higher loads, the injection timing is earlier and longer, causing the fuel initially to penetrate deeper into the cylinder volume so that the charge is extended circumferentially into a greater portion of the combustion chamber. At full speed and loads, the initial fuel penetration into the cylinder volume is greatest, and the mixture cloud substantially fills the combustion chamber.

Secondly, the invention permits the location of the spark plug at a position that is favorable from a design point of view, and one that is optimum for combustion initiation at every load and speed.

Thirdly, the fuel injector can be located at a position that is favorable from a design point, and can be directed to assure a maximum travel or penetration of the fuel spray without wetting the inside surfaces of the cylinder and piston. Also, the cooling of the injector can be simpler, thus eliminating a heat soak problem.

And, fourthly, the invention eliminates the highly turbulent area that is normally generated in the middle of essentially concentric combustion chambers by the squish air layers from each side hitting each other, which tends to disperse part of the light load mixture clouds.

It is one of the objects of the invention, therefore, to provide an internal combustion engine construction that operates efficiently at all loads by burning fuel in the presence of excess air at partial loads, and achieving full air utilization and smokeless combustion at full loads.

A further object of the invention is to assure high dispersion of the residual gases, and suitable stratification at full loads so that elevated compression ratios can be applied without the detonation that normally occurs in a conventional internal combustion engine.

It is a still further object of the invention to provide a stratified charge engine wherein the controlling air motion pattern is that imparted by the squish action of the piston. Air streams all flowing in the same general direction from one side of the bore to the other are set up, with very little or only microscopic mixing between the air layers. The fuel injector is located in a strategic position adjacent a combustion chamber that is located to one side of the cylinder volume. The fuel particles or spray are injected into the squish air layers in the chamber and cylinder volume against the direction of movement of the squish air streams at a velocity to provide a deep penetration of the fuel into the squish air layers without wetting the cylinder side walls and head or piston top.

It is also an object of the invention to provide an internal combustion engine construction having an unthrottled air intake, and one in which combustion is initiated in a small portion of the cylinder volume where the air-fuel mixture is chemically correct. This provides efficient combustion of a small charge at part loads by utilizing only a small portion of the total fresh air intake, the remaining air being essentially uncombined with any of the fuel particles.

Other objects, features, and advantages of the invention will become apparent upon reference to the succeeding detailed description thereof, and to the drawings illustrating the preferred embodiments thereof; wherein, FIGURES 1, 2, 3 and 4 are schematic cross-sectional views of a portion of an engine constructed according to the invention, the figures sequentially illustrating the operation during increasing loads on the engine;

FIGURES 1A, 2A, 3A and 4A are plan views of the constructions shown in FIGURES 1, 2, 3 and 4, respectively;

FIGURES 5 through 12A illustrate modifications of the combustion chamber shown in FIGURES 1 through 4A; and, FIGURES 13 and 13A illustrate a further embodiment of the invention.

As stated previously, the invention provides an engine that achieves efficient combustion of fuel in the presence of excess air at part load, and achieves full air utilization and smokeless combustion at full engine load.

Figure 1A:
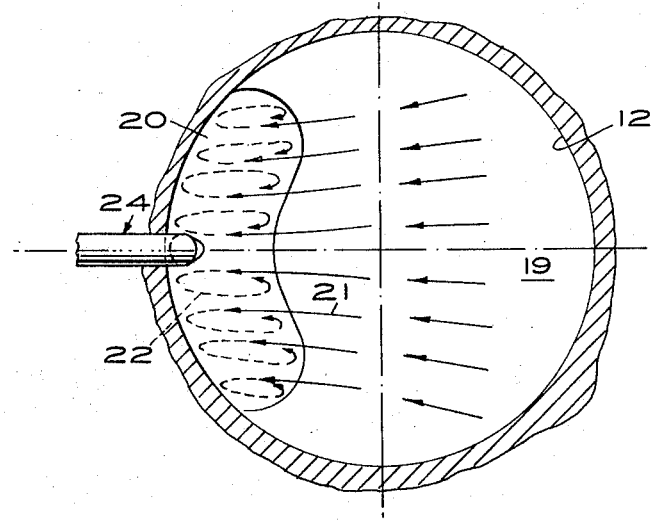
Figure 1:
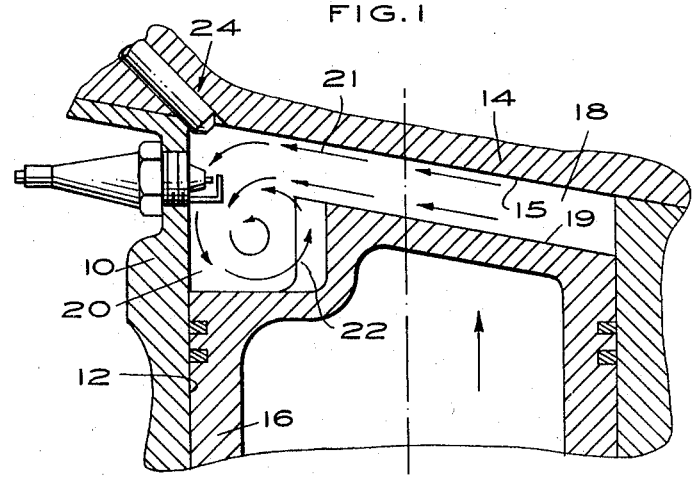

FIGURES 1 through 4A show one form of engine embodying the squish air impregnation stratified charge combustion process. The details of construction of the engine are the same in each of these figures. FIGURES 1 and 1A show the air flow pattern that is caused by the squish action of the piston during its compression stroke. FIGURES 2 through 4A show the air flow and mixture cloud formations during light, medium, and full load conditions of operation, respectively.

More specifically, FIGURES 1 through 4A show a portion of an engine block 10. It has a cylindrical bore 12 that is closed by a cylinder head 14. The head has a flat inclined inner surface 15, and includes intake and exhaust valves, not shown. The intake valve would be such as to impart only a negligible turbulence to the intake air; that is, just enough to aid in fuel evaporation and combustion but not enough to establish any significant air swirl motion to the charge, as will be explained more fully later. The bore 12 slidably and sealingly receives an annular reciprocating piston 16 within it, which together with the head 14 and bore walls defines a compartment 18. The top 19 of the piston is, for the most part, flat, and parallel to the head inner surface 15. It is provided at one side with a combustion chamber 20 that has substantially a crescent shape, as best seen in FIGURE 1A. The location of the combustion chamber adjacent the cylinder wall provides a squish area between the piston top surface 19 and the cylinder head surface 15 of between 50%–85%.

The inclined surfaces 15 and 19 of the cylinder head and piston top induce the flow of all of the air in the same general direction from one side of the bore to the other, as indicated in general in FIGURE 1A, parallel to the cylinder head surface and toward combustion chamber 20 during the squish action, as indicated by arrows 21. Due to the effect of the strong squish action, coupled with the fact that the swirl air motion is negligible, the air will flow in gradually converging air streams, as shown in FIGURE 1A, without extensive mixing between the layers. During the compression stroke, therefore, air is transferred from compartment 18 into the combustion chamber at an increasing rate. Upon approaching the top dead center position, the decreasing height squish air stream widens and generally follows the pattern shown in FIGURE 1A, the flow velocity increasing substantially. In the chamber, the squish air flow follows the confining walls and sets up an air rotation, as indicated by arrows 22.

A fuel injector 24 is installed in the cylinder head close to the cylinder wall. It is angled so as to direct fuel spray into all areas of the combustion chamber 20 and toward compartment 18, and against the squish air flow. It could also be located in the cylinder wall close to the cylinder head, if desired. The injector is of a known low pressure type (100–1000 p.s.i., for example). It has an outwardly opening nozzle 26 that is symmetrically located with respect to the circumferential extent of the combustion chamber, and discharges a spray of fuel through, for example, a 60° to 120° included cone angle. The nozzle alternately could have a fixed orifice.

A spark plug 28 is positioned in the cylinder wall with its electrodes 30 and 32 locating the spark gap directly beneath the top of the injector nozzle 26. The spark gap is also located so as to be close to or in the plane of the squish air flow streamline that intersects the center line of the fuel spray at 10° to 35°, for example, before top dead center position of the piston.

Figure 2A:
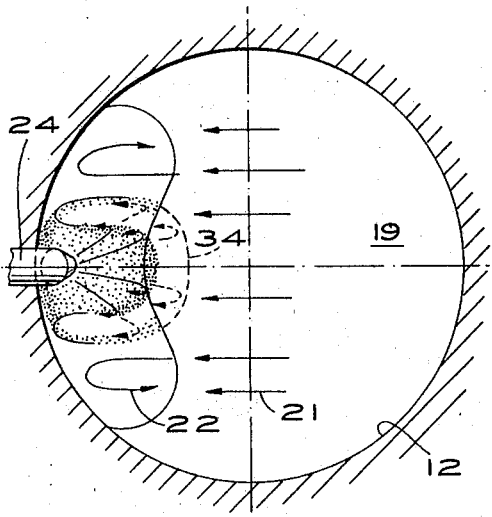
Figure 2:
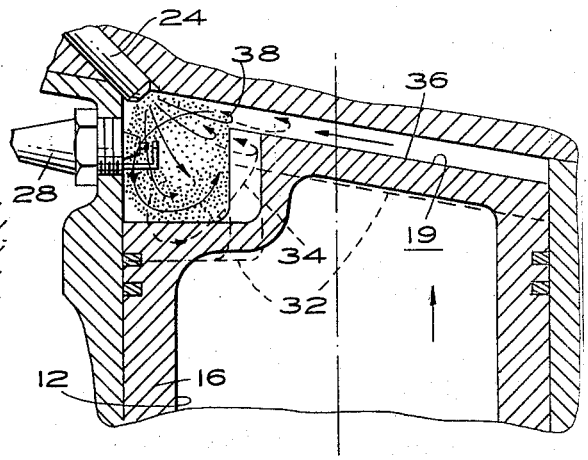

FIGURES 2 and 2A show the engine operation during light load conditions. During the intake stroke of the piston, the cylinder bore is filled with a charge of air through the intake valve (not shown) in the cylinder head. The valve then closes, and the piston begins its compression stroke. The dotted line 32 indicates the position of piston 16 when the fuel initially is injected from nozzle 26. The initial injection timing, of course, will vary with the load. That is, the injection end points are essentially the same for light and medium loads, and is only slightly advanced for high at full loads. Because of the uniform injection rate, the beginning of injection will be advanced in proportion to the increase in load. For light loads, therefore, the fuel is injected late in the compression stroke, and has only a short duration, the injection ending between 20° and 50°, for example, before top dead center position of the piston. At the instance of injection, the fuel is sprayed radially into combustion chamber 20 directly against the rotary air flow, and also toward the cylinder volume of compartment 18 directly against the transversely moving squish air flow streams. The injection is made at such low injection pressures, atomization, and spray cone angles, and the initial injection is so late in the compression stroke, that the fuel particles initially can penetrate into the squish air in the chamber and the cylinder volume only to the dotted line position 34 before being turned back into the chamber by the air flow. The fuel is thus rapidly dispersed, and efficiently evaporated. The line 34 is calculated to be the farthest point reached before the oppositely directed fuel particle and squish air velocities equalize after which the squish air turns back the fuel particles.

Upon continued ascent of the piston to the full line position 36, the squish air flow velocity becomes stronger and the air more dense. As a result, the depth of penetration of the fuel particles into the squish air stream decreases progressively with the continued ascent of the piston and the constant rate of injection. The fuel injected may wet a small portion of the combustion chamber surfaces; however, it does not wet the cylinder walls. Efficient evaporation of the fuel thus results. The squish air continues to turn the fuel spray back into chamber 20, as indicated by arrows 38, and the fuel that was injected into the chamber is carried around by the rotating air streams. This results in an increasing richness of the mixture cloud towards its center in front of the injector and spark gap.

It will be seen, therefore, that the fuel-air mixture cloud, indicated as the shaded portion, and formed by the dispersion of the fuel in the air, assumes substantially the shape of a tubular section of short circumferential length at light loads, and that it is contained substantially entirely within the combustion chamber 20. The point of ignition will occur after initial injection at a time, determined by suitable calculations, when the fuel droplets have evaporated, and combined with just the right amount of the squish air to provide a stoichiometric or chemically correct fuel-air mixture in the combustion chamber at the point adjacent the spark gap. The firing of the spark plug 28 at this instant by suitable timing control means, not shown, then provides complete combustion of the mixture cloud by the initial burning of the mixture at the plug, and the subsequent burning of the remaining mixture by the spreading of the flame front throughout the chamber. The squish air in the remaining cylinder volume will be essentially fresh air. As a result, the engine will provide smokeless combustion with high efficiency, utilizing only a portion of the total intake of air.

At light loads, the mixture cloud is of relatively short extent, as described. The magnitude of the cloud, of course, is influenced by a number of factors. The circumferential extent of the cloud will vary as a function of the cone angle of the fuel spray and the velocity of the squish air. Thus it is controlled by the shape of the combustion chamber and the duration of injection. The radial thickness of the cloud will vary in proportion to the denseness of the squish air stream, and thus vary with the advance in intial injection upon an increase in load. The axial extent of the cloud will vary as a function of the cone angle of the spray, and the depth of penetration of the fuel particles into the squish air. Thus, it varies with the change in initial injection point. As the load increases, therefore, advancing the initial injection and, therefore, the duration of injection, the size of the mixture cloud increases.

As stated previously, the intake valve imparts only sufficient turbulence to the intake air to accelerate fuel evaporation and combustion. The magnitude of the turbulence would be in proportion to the intake air velocity, and the cross-sectional area of the valve would be only that necessary to achieve the small turbulence level promoting efficient combustion.

The process can be used with conventional, unmasked intake valves by controlling the size of the intake valve or by varying the intake throat diameter immediately above the intake valve to provide an optimum microscopic turbulence.

Figure 3A:
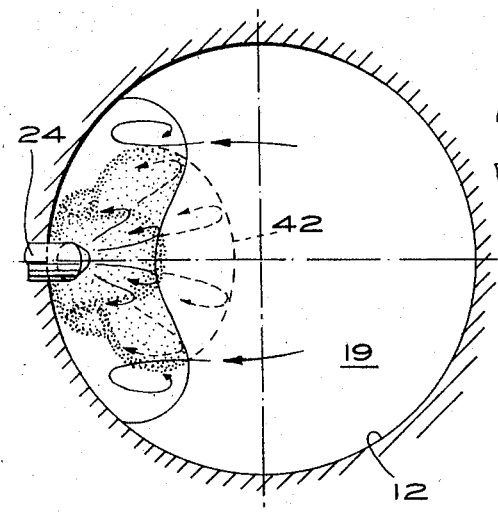
Figure 3:
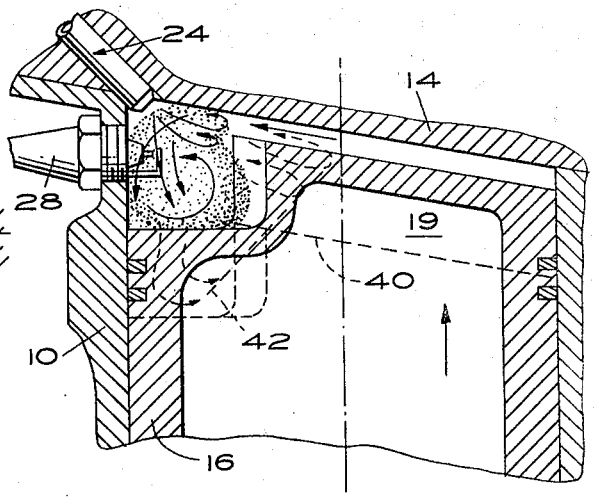

FIGURES 3 and 3A show the operation during a medium load condition. As the load on the piston increases, the amount of fuel necessary to raise the pressure increases. Therefore, the injection of fuel spray is initiated earlier than during the light load conditions of FIGURE 2, and, accordingly, lasts longer, since the injection ending points are substantially the same for light and medium loads. That is, as seen in FIGURES 3 and 3A, the dotted line 40 indicates the position of the piston at the moment fuel is initially injected. Because of the earlier injection, the squish air is less dense, and its velocity, in this position of the piston, is lower. Therefore, the fuel spray can penetrate deeper and wider into the squish air streamlines in the cylinder volume, to the position indicated by the dotted line 42. The circumferential extent 44 and the magnitude of the fuel-air mixture cloud is, therefore, greater, as indicated in FIGURE 3A.

As the piston approaches top dead center position, the rapidly increasing velocity of the squish air overcomes the fuel particle velocities sooner and sooner as the piston ascends. Thus, for every position of the piston, the fuel particles are driven back into the combustion chamber, as indicated by the turned arrows, just prior to the time when the spray would normally contact and wet the cylinder walls and piston top. That is, the penetration depth and width of the fuel particles becomes less and less as the piston moves progressively upwardly towards the top dead center position. Timed ignition again takes place when the piston reaches the full line position 46, for example, at which point the portion of the air-fuel mixture cloud adjacent the spark gap reaches the optimum mixture strength, i.e., the chemically correct composition, enabling complete burning of the mixture and total combustion. It will be seen, therefore, that at medium loads, more of the air intake is utilized, the amount being that necessary to provide optimum combustion.

FIGURES 4 and 4A show the squish air flow pattern and fuel-air mixture cloud formation under high and full load conditions of operation. The injection is again earlier and longer in duration. Also, the injection ending point is slightly advanced. The piston will be in the dotted line position 48 at the beginning of injection. This permits deeper and wider penetration of the fuel particles into the cylinder volume to the dotted line 49 due to the lower density and velocities of the squish air at this point. Ascent of the piston will progressively increase the squish air velocity and progressively drive the fuel-air particles back into the combustion chamber earlier as the injection continues at the substantially constant rate, so that an air-fuel mixture cloud will exist of a magnitude that substantially fills the combustion chamber. The mixture will be richest in the plane of the spark plug, and the ends of the chamber will form fresh air or lean mixture pockets. Also, fresh air or lean mixture is located in the squish area due to the greater initial fuel penetration by the earlier initial injection.

In this embodiment, a short delay is provided between the injection ending and the ignition timing. This allows part of the air in the squish area to be mixed to the chamber content. At the instance of injection, therefore, a lean mixture or fresh air fills the two ends of the chamber and the squish area. This distribution decreases the danger of detonation. Ignition occurs when the piston reaches the full line position 50, when the mixture cloud has combined with sufficient air to provide the chemically correct composition at the spark plug gap to effect complete combustion. The flame front spreads outwardly, completely burning the leaner mixtures at the ends of the chamber and in the squish area. Thus, at full loads, fuller air utilization is achieved.

While the combustion chamber of FIGURES 1 through 4 has a substantially crescent shape in plan view, it will be apparent that other shapes of combustion chambers could be used to accomplish the same result.

The effect of changing the shape of the combustion chamber and the squish area are important factors in achieving optimum mixture ratios. For example, increasing the squish area means faster air flow into the chamber. At a given load, it necessitates shorter but increased rate of injection. The decrease of injection duration means shorter spray penetration, and, therefore, greater fuel concentration at elevated loads. Therefore, it can be said that increasing the squish area causes an increase in the mixture cloud richness at elevated loads.

Increasing the ratio of combustion chamber length to the chamber radial width results in a wider squish air stream. Therefore, at light loads, with a given cone angle fuel spray, a decreased portion of the combustion chamber air is impregnated by the same amount of fuel. It can be said, therefore, that increasing the combustion chamber length results in an increase in the mixture cloud richness at light loads because of less air being impregnated by the fuel. Conversely, the decreasing of the chamber length results in leaning of the light load mixture clouds. Going in the direction of the shorter circumferential extent chambers, the general level of mixing also increases since the squish air flow converges or deviates increasingly from the parallel streamline configuration as it passes into the chamber.

FIGURES 5 through 12A idllustrate other shapes of combustion chamber utilizing this squish impregnation stratified charge combustion process.

In each of FIGURES 4 through 9A, the injector and spark plug are located in essentially the same positions as the corresponding elements in FIGURES 1 through 4A. In FIGURES 10 through 12A, however, their locations are changed either because of the shorter circumferential length or greater radial extent of the combustion chambers. In these latter figures, the rapid convergence of the air streams toward the combustion chamber make it desirable to provide some mixing of the fuel with the air in the squish area, where the air streams are still essentially independent of each other. Otherwise, the extensive mixing or turbulence created in the back portion of the combustion chamber by the colliding streamlines might spread the mixture cloud too great an amount for optimum combustion. Accordingly, the spark plug and injector are moved to locations providing optimum air-fuel ratios and complete combustion. In FIGURES 10 through 12A, the fuel is injected against the squish air at a location that is more toward the front of the combustion chamber than in FIGURES 1 through 9A.

Figure 13:
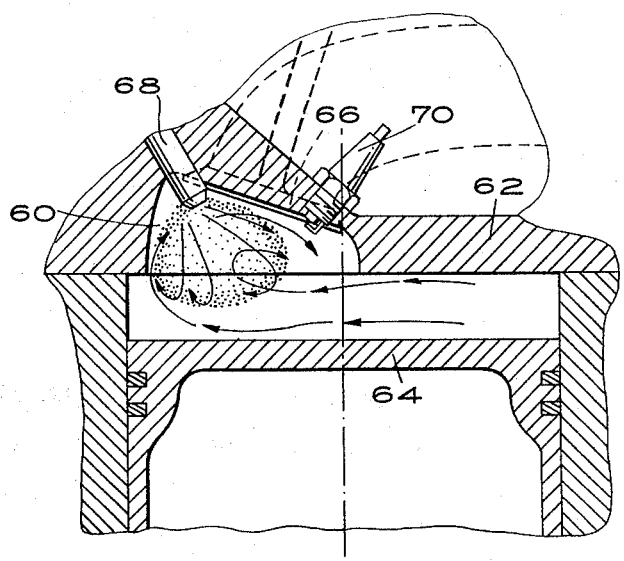
Figure 13A:
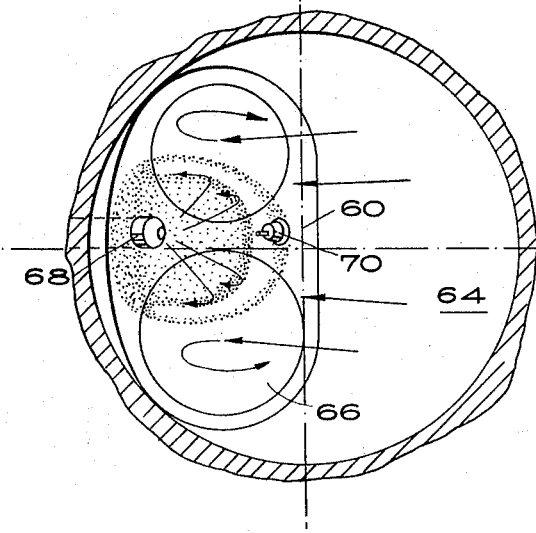

FIGURE 13 shows a further modification of the invention. In this embodiment, the engine has a wedge-shaped combustion chamber 60 located in the cylinder head 62 instead of in the piston 64 as previously described. This construction is more adaptable to conventional internal combustion engine constructions. The same operation, however, occurs. The cylinder is charged with fresh air past an unmasked intake valve 36 that provides essentially no swirl or turbulence to the air. As the piston 34 moves through its compression stroke, the squish motion causes the air to move axially towards the left in close but for the most part non-mixing air streams into chamber 60 and set up an air rotation in the chamber. The fuel spray is injected in the same manner as in the previous embodiments; that is, the initial injection and duration of injection will vary with the load. The fuel is directed by an injector 68 into the chamber and cylinder volume directly into and against the squish air streams. The fuel spray penetrates into the cylinder volume initially to a depth and width proportional to the load without wetting the surfaces of the piston or the cylinder walls and head; that is, the fuel particle and squish air velocities equalize just prior to this point. The substantially tubular-shaped mixture cloud 68 becomes richest adjacent the spark gap, and is then ignited at the proper moment by a plug 70, and complete combustion occurs. Only a portion of the total air intake is utilized for partial loads, with substantially full utilization at full loads.

While the invention has been illustrated in its preferred embodiments in the figures, it will be clear to those skilled in the arts to which the invention pertains that many changes and modifications can be made thereto without departing from the scope of the invention. For example, while an engine having only one cylinder has been used, to illustrate the process and apparatus of the invention, it will be clear that engines having a multiple number of cylinders is within the scope of the invention. It is to be noted that since the squish action is so strong that it overcomes any swirl motion that might be imparted to the incoming air, the process could also be used with masked intake valves. For example, air intake charge rotations of either a single or double swirl could be obtained having centerlines perpendicular to the cylinder bore and parallel to the direction of the squish air stream. The application of this motion would result in a leaner mixture at high loads because of the increased turbulence causing mixing between squish layers, but would only slightly affect the mixture ratio at medium loads, and not at all at light loads.

Also, these same effects would be obtained by the use of intake valves imparting a slight axial swirl charge to the incoming air. In this case, the streamlines of the squish air stream would be modified by the axial component, and, therefore, the combustion chamber and spark gap could be turned in the direction of the axial swirl relative to the injector nozzle.

We claim:

1. An internal combustion engine of the spark ignition unthrottled type having a cylindrical bore and a piston member moving reciprocably therein, a cylinder head member closing said bore and together with said piston member and bore defining an air flow chamber, and a combustion chamber formed in a portion of one of said members and located to one side of the axis of said bore and radially within the cylindrical surface of projection of said bore, said air flow chamber containing a charge of fresh air therein having a negligible swirl air motion, the remaining surface portion of said one member being essentially parallel with the axially adjacent surface of the other member, said surface portions together with the walls of said bore defining said air flow chamber constituting a squish area for the transfer by the piston during the compression stroke of said piston of the air in said air flow chamber transversely across and essentially parallel to the top of the piston surface from one side of said latter chamber towards a diametrically opposite side towards and into said combustion chamber in streamline air layers, the major portion of which extend essentially in the same general direction, said combustion chamber being contiguous with and extending axially and radially from said air flow chamber effecting flow of squish air thereinto and having a shape that effects an air rotation of said air layers in said combustion chamber, low pressure injection means adjacent said chamber injecting a fuel spray directly into said combustion chamber and cylinder volume in a direction against said rotating squish air stream whereby said air stream redirects the fuel spray back into said combustion chamber to reduce the penetration distance of said fuel into said air and prevent a substantial wetting of the cylinder walls to thereby effect a fuel-air mixture cloud concentrated substantially within said combustion chamber with essentially fresh air in the air flow chamber, and means adjacent said combustion chamber for igniting said mixture cloud.

2. An engine as described in claim 1, said combustion chamber being essentially crescent shaped.

3. An engine as in claim 1, said essentially parallel piston and cylinder head surfaces being inclined in a direction to aid in the flow of air from said air flow chamber into said combustion chamber.

4. An engine as described in claim 1, said injection means being located essentially at the juncture of the cylinder bore wall and the cylinder head member surface, and disposed to direct fuel into said combustion chamber.

5. An engine as described in claim 1, wherein the shape of said mixture cloud is substantially that of a short tube section symmetrically located in said combustion chamber.

6. An engine as described in claim 1 wherein said combustion chamber is formed in the top of said piston member.

7. An engine as described in claim 1 wherein said combustion chamber is formed in said cylinder head member.

8. An engine as described in claim 1 wherein the location of said combustion chamber to one side of said bore defines a squish area of at least 50% of the volume between said piston and cylinder head.

9. An engine as described in claim 1 wherein said combustion chamber is symmetrically arranged with respect to the horizontal centerline of said bore and located to one side of the bore vertical center line.

References Cited by the Examiner

UNITED STATES PATENTS

| 2,012,086 | 8/1935 | Mock | 123—30.21 |
| 2,265,677 | 12/1941 | Straub | 123—32.2 |
| 2,371,787 | 3/1945 | Ward | 123—32 |
| 2,615,437 | 10/1952 | Broderson | 123—32 |
| 2,907,308 | 10/1959 | Meurer et al. | 123—32 |
| 3,079,901 | 3/1963 | Hallberg | 123—32 |
| 3,094,974 | 6/1963 | Barber | 123—32 |
| 3,125,080 | 3/1964 | Hoffmann | 123—30.21 |

FOREIGN PATENTS

| 385,020 | 12/1932 | Great Britain. |
| 524,639 | 8/1940 | Great Britain. |

MARK NEWMAN, *Primary Examiner.*

RICHARD B. WILKINSON, *Examiner.*

L. M. GOODRIDGE, *Assistant Examiner.*